(12) United States Patent
Jansson et al.

(10) Patent No.: US 11,702,973 B2
(45) Date of Patent: Jul. 18, 2023

(54) CONTROLLING UREA INJECTION IN EXHAUST AFTER TREATMENT SYSTEMS

(71) Applicant: VOLVO TRUCK CORPORATION, Gothenburg (SE)

(72) Inventors: Jonas Jansson, Hönö (SE); Björn Henriksson, Gothenburg (SE); Lars Carlhammar, Lindome (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/664,336

(22) Filed: May 20, 2022

(65) Prior Publication Data

US 2022/0381171 A1 Dec. 1, 2022

(30) Foreign Application Priority Data

May 26, 2021 (EP) ..................................... 21175937

(51) Int. Cl.
*F01N 3/20* (2006.01)
*F01N 3/035* (2006.01)
*F01N 13/00* (2010.01)

(52) U.S. Cl.
CPC .............. *F01N 3/208* (2013.01); *F01N 3/035* (2013.01); *F01N 3/2066* (2013.01);
(Continued)

(58) Field of Classification Search
CPC ........ F01N 3/208; F01N 3/035; F01N 3/2066; F01N 13/009; F01N 13/0093;
(Continued)

(56) References Cited

U.S. PATENT DOCUMENTS

| | | | |
|---|---|---|---|
| 2011/0106402 A1 | 5/2011 | Yasui et al. | |
| 2014/0020364 A1* | 1/2014 | Wittrock | F01N 3/208 60/274 |

(Continued)

FOREIGN PATENT DOCUMENTS

| | | |
|---|---|---|
| DE | 102017221573 A1 | 6/2019 |
| JP | 2018105293 A | 7/2018 |
| WO | 2015108541 A1 | 7/2015 |

OTHER PUBLICATIONS

Extended European Search Report in corresponding European Application No. 21175937.8 dated Oct. 27, 2021 (7 pages).

(Continued)

*Primary Examiner* — Brandon D Lee
(74) *Attorney, Agent, or Firm* — Venable LLP; Jeffri A. Kaminski (57) ABSTRACT

A method for controlling urea injection in an exhaust aftertreatment system includes injecting urea at a flow rate upstream of the first catalytic reduction device; measuring a level of nitrogen oxides downstream of the first catalytic reduction device and upstream of the second catalytic reduction device; controlling the flow rate of the urea injection until the measured level of nitrogen oxides fulfils a predetermined condition; if the measured level of nitrogen oxides is decreasing in response to reducing the flow rate of the urea injection, reducing the flow rate of the urea injection, and controlling a flow rate of urea injection using the second urea injector upstream of the second catalytic reduction device according to the measured level of nitrogen oxides downstream of the first catalytic reduction device and upstream of the second catalytic reduction device.

14 Claims, 4 Drawing Sheets

(52) U.S. Cl.
CPC ........ *F01N 13/009* (2014.06); *F01N 13/0093* (2014.06); *F01N 2250/02* (2013.01); *F01N 2560/026* (2013.01); *F01N 2570/14* (2013.01); *F01N 2590/08* (2013.01); *F01N 2610/02* (2013.01); *F01N 2610/146* (2013.01); *F01N 2900/14* (2013.01); *F01N 2900/1402* (2013.01); *F01N 2900/1812* (2013.01)

(58) Field of Classification Search
CPC .......... F01N 2250/02; F01N 2560/026; F01N 2570/14; F01N 2590/08; F01N 2610/02; F01N 2610/146; F01N 2900/14; F01N 2900/1402; F01N 2900/1812
See application file for complete search history.

(56) References Cited

U.S. PATENT DOCUMENTS

| | | | |
|---|---|---|---|
| 2016/0290201 A1* | 10/2016 | Haas | .................. F01N 3/208 |
| 2018/0135488 A1 | 5/2018 | Hendrickson et al. | |
| 2018/0142593 A1 | 5/2018 | Wang et al. | |
| 2020/0095916 A1* | 3/2020 | Haas | ................ F02D 41/1465 |
| 2021/0131332 A1* | 5/2021 | Binetti | ................ F01N 3/208 |
| 2022/0259995 A1* | 8/2022 | Jin | ..................... F01N 9/00 |

OTHER PUBLICATIONS

Extended European Search Report in corresponding European Application No. 22171111.2 dated Oct. 26, 2022, 7 pages.

\* cited by examiner

CONTROLLING UREA INJECTION IN EXHAUST AFTER TREATMENT SYSTEMS

TECHNICAL FIELD

The present disclosure relates to a method for controlling urea injection in an exhaust aftertreatment system. The present disclosure also relates to a corresponding exhaust aftertreatment system. Although the method and system will be described in relation to a vehicle in the form of a truck, the method and system can also be efficiently incorporated in other vehicles types such as e.g. buses and construction equipment.

BACKGROUND

Modern exhaust aftertreatment systems for vehicles comprise catalytic devices for reducing the amount of nitrogen oxides that is emitted into the atmosphere. In such catalytic devices, urea which includes ammonia is injected into the exhaust gas stream of the exhaust aftertreatment system to allow for ammonia to react with the nitrogen oxides. The resulting product is nitrogen and water. A commonly used catalytic device type is a so-called selective catalytic reduction device.

Some exhaust aftertreatment systems comprise two selective catalytic reduction devices. Using two selective catalytic reduction devices may for example improve the performance of the exhaust aftertreatment system during cold-starts by allowing the first selective catalytic reduction device to be relatively small and therefore heat up quickly, whereas the second selective catalytic reduction device is of standard size.

However, one issue with dual catalytic device systems is to properly control the dosing of urea upstream of the first catalytic device. Over-injecting urea in the upstream catalytic device, leads to ammonia-slip after the upstream catalytic device. The excess ammonia is converted to nitrogen oxides such as nitrous oxide ($N_2O$) in downstream devices of exhaust aftertreatment systems, such as particulate filters or oxidation catalysts. Emission of nitrous oxide and other unwanted nitrogen oxide products should be kept at a minimum.

Accordingly, there is a need to better control the urea injection in dual catalytic device systems to provide more accurate urea dosing.

SUMMARY

An object of the invention is to provide a method and system for controlling urea injection in exhaust aftertreatment systems that at least partly alleviates the deficiencies with the prior art.

According to the first aspect of the invention, there is provided a method for controlling urea injection in an exhaust aftertreatment system comprising at least a first catalytic reduction device arranged downstream of a first urea injector, and a second catalytic reduction device arranged downstream of a second urea injector, the method comprising the steps of: injecting urea at a flow rate upstream of the first catalytic reduction device; measuring a level of nitrogen oxides downstream of the first catalytic reduction device and upstream of the second catalytic reduction device; controlling the flow rate of the urea injection until the measured level of nitrogen oxides fulfils a predetermined condition; if the measured level of nitrogen oxides is decreasing in response to reducing the flow rate of the urea injection, reducing the flow rate of the urea injection, and controlling a flow rate of urea injection using the second urea injector upstream of the second catalytic reduction device according to the measured level of nitrogen oxides downstream of the first catalytic reduction device and upstream of the second catalytic reduction device.

The present invention is based on the realization that if the level of nitrogen oxides downstream of the first catalytic reduction device is decreasing, instead of increasing, when the urea injection is reduced an excess of urea has been injected so that ammonia-slip may already have occurred and nitrogen oxides such as nitrous oxide is likely being formed. By the provision of the described method, in response, the urea injection flow rate is reduced to thereby prevent ammonia-slip downstream of the first catalytic device. Further, the control of the flow rate from the second urea injector is adapted so that a target total nitrogen oxide conversion of the exhaust aftertreatment system is maintained. Thus, to ensure that the NOx-conversion target for the aftertreatment system is achieved when the dosing is varied upstream of the first catalytic reduction device, e.g., a so-called pre-SCR, the NOx-conversion not handled by the first catalytic reduction device is compensated by the urea injection in the second catalytic reduction device in order to always maintain the target total NOx-conversion.

In one possible implementation, while the urea is injected at a flow rate upstream of the first catalytic reduction device, the urea injection flow rate using the second urea injector is adjusted to compensate for the increase or decrease in urea injection over the first catalytic reduction device, to maintain the total NOx-conversion of the aftertreatment system comprising the first and second SCR above a specified target total NOx-conversion.

By the provision of the herein proposed method, it is ensured that the level of nitrogen oxides after the first catalytic reduction device fulfils the predetermined condition which may be adapted to allow for efficient use of the second catalytic reduction device and the second urea injector, while at the same time reducing the risk of ammonia-slip between the first catalytic reduction device and the second catalytic reduction device. In other words, the injection of urea using the second urea injector arranged downstream of the first catalytic reduction device and upstream of the second catalytic reduction device is controlled to achieve a specified target total NOx-conversion level of the aftertreatment system. A specified target total NOx-conversion level may be adapted to fulfil a certain legal demand on NOx-emission or an internal target on maximum amount of NOx-emissions from the total aftertreatment system. The NOx levels may be measured by having a NOx-sensor downstream the second catalytic reduction device. The target NOx-conversion level may be calculated from the absolute value of target max NOx-level after the second catalytic reduction device and the amount of NOx which is being emitted from the combustion engine.

A catalytic reduction device is generally a device able to reduce the level of nitrogen oxides in exhaust aftertreatment systems of vehicles. Various types of catalytic reduction devices are per se known and are conceivable options for embodiments of the present invention, and some examples are selective catalytic reduction devices, lean nitrogen oxide traps, hydrogen-carbon selective catalytic reduction devices and an selective catalytic reduction-coated diesel particulate filters.

The level of nitrogen oxides may be defined in different ways and is not limited as such. For example, the level of nitrogen oxides may be a relative amount, e.g. a ppm of the total amount of exhaust gas flow, or the level of nitrogen oxides may be nitrogen oxide flow, e.g. measured as mass/unit time, for example, gram/second.

The predetermined condition is a condition that indicates a desirable level of nitrogen oxides in the exhaust gas, for example as a range of the amount of nitrogen oxides or as a predetermined minimum level.

According to an example embodiment, the predetermined condition may be a predetermined level of nitrogen oxides, wherein the step of controlling the flow rate of urea injection comprises, if the measured level of nitrogen oxides is below a threshold value, reducing the flow rate of the urea injection until the level of nitrogen oxides is at or exceeds the predetermined level. Hereby, by selecting the threshold value of nitrogen oxides appropriately above a desired minimum level of nitrogen oxides, it can be ensured that the level of nitrogen oxides is maintained above this minimum level of nitrogen oxides. Thus, the level of nitrogen oxides is at a suitable level before the second catalytic reduction device while the risk of ammonia-slip at the first catalytic reduction device is kept low. The suitable level is adapted so that the second injector and the second catalytic reduction device can maintain the specified target total NOx-conversion.

In one example, the temperature of the second catalytic reduction device is monitored by a temperature sensor. If the temperature of the second catalytic reduction device fall below a threshold temperature below which the NOx conversion rate of the second catalytic reduction device is not sufficient for maintaining the target total conversion NOx level, the utilization of the first catalytic reduction device may be increased, i.e., achieving a higher NOx-conversion, by injecting more urea until more favourable conditions occur in the second first catalytic reduction device. Typically, the utilization of the first catalytic reduction device will be maximum when the temperature of the second catalytic reduction device is below about 220° C. average temperature. A more favourable condition include catalyst temperature and exhaust gas flow conditions which enable higher NOx-conversion in the second catalytic reduction device. For example, if the second catalytic reduction device has not yet been heated to its operating temperature.

The predetermined level of nitrogen oxides may be equal to the threshold value of nitrogen oxides.

However, in other embodiments, the predetermined level of nitrogen oxides is different from, i.e. not equal to, the threshold value of nitrogen oxides. This advantageously allows for a certain level of hysteresis, i.e. the actual preferred level may have shifted due to hysteresis.

According to an example embodiment, the step of reducing the flow rate of the urea injection may comprise reducing the flow rate of the urea injection further until the measured level of nitrogen oxides is increasing. Thus, in order to further improve the efficiency of urea dosing may, firstly, a control point for urea injection be found with minimum, or at least near-minimum levels of nitrogen oxides, whereby the urea injection is further reduced to lower the risk of ammonia-slip further.

According to an example embodiment, the method may comprise stopping the reduction in urea injection flow rate once the measured level of nitrogen oxides fulfils the predetermined condition. Hereby, it is advantageously ensured that the level of nitrogen oxides is not at a too high level.

According to an example embodiment, the method may comprise calculating the flow rate of urea injected upstream of the first catalytic reduction device based on a modelled value of nitrogen oxides upstream of the first selective catalytic reduction device. Thus, there is no need for a nitrogen oxide sensor upstream of the first catalytic reduction device. Instead, a modelled value may be used as the basis for calculating the demanded urea-injection to the first catalytic reduction device. The modelled nitrogen oxide may be based on engine operation and type. Urea injection may as a starting point be limited to corresponding to for example 80-90% of modelled NOx out from the engine.

In preferred embodiments, the urea injection may be continuously controlled based on the measured levels of nitrogen oxides. This advantageously provides for improved control of the urea injection flow rate. Continuous control provides for maintaining the level of nitrogen oxides and the flow rate of urea at desired levels and for quickly responding to detected changes in the levels of nitrogen oxides in the exhaust gas.

According to a second aspect of the invention, there is provided an exhaust aftertreatment system comprising at least a first catalytic reduction device arranged downstream of a first urea injector, a second catalytic reduction device arranged downstream of a second urea injector and downstream of the first catalytic reduction device, and a sensor for measuring a level of nitrogen oxides downstream of the first catalytic reduction device and upstream of the second catalytic reduction device, a control unit arranged to receive data from the sensor and to transmit control signals to the first injector and to the second injector to thereby control the injection of urea from the first urea injector and from the second urea injector, wherein the first urea injector is responsive to a control signal to inject urea at a flow rate upstream of the first catalytic reduction device, wherein, the first urea injector is responsive to a second control signal to control the flow rate of the urea injection until the measured level of nitrogen oxides fulfils a predetermined condition; and in response to that the measured level of nitrogen oxides is decreasing in response to reducing the flow rate of the urea injection, the first urea injector is responsive to a third control signal to reduce the flow rate of the urea injection, the second urea injector is responsive to a control signal to control a flow rate of urea injection using the second urea injector upstream of the second catalytic reduction device and downstream of the first catalytic reduction device according to the measured level of nitrogen oxides downstream of the first catalytic reduction device and upstream of the second catalytic reduction device.

According to example embodiments, the exhaust aftertreatment system may comprise at least one of a Diesel Oxidation Catalyst and Diesel Particulate Filter, arranged directly downstream of the first catalytic reduction device and upstream of the second catalytic reduction device. Thus, no ammonia-slip catalyst is needed between the first catalytic device and the at least one of the Diesel Oxidation Catalyst and Diesel Particulate Filter, which reduces both cost and complexity of the exhaust aftertreatment system.

A filter collecting soot may be located between the two catalytic reduction devices. The soot is normally burnt with a nitrogen dioxide (NO2) based chemical reaction. This NO2 is formed by the diesel oxidation catalyst which oxidises the nitrogen oxide (NO) from the engine to NO2. If the amount of soot in the filter is increasing above a certain threshold level, the NOx flow may be reduced by lowering the utilization of the first catalytic reduction device.

According to example embodiments, the second urea injector may be arranged downstream of the at least one of a Diesel Oxidation Catalyst and Diesel Particulate Filter. Hereby, urea injected from the second urea injector is advantageously not passed through the at least one of a Diesel Oxidation Catalyst and Diesel Particulate Filter. Further, this location of the second urea injector facilitates the dosing of urea with regards to avoiding ammonia-slip downstream of the second catalytic device.

According to example embodiments, the exhaust aftertreatment system may comprise a PID-controller for continuously controlling the flow rate of the first urea injector based on the measured levels of nitrogen oxides. A PID-controller provides an efficient and relatively easy way to implement the continuous control of the urea flow rate.

Effects and features of the second aspect of the invention are largely analogous to those described above in connection with the first aspect.

According to a third aspect of the invention, there is provided a vehicle comprising the system according to the second aspect.

According to a fourth aspect of the invention, there is provided a computer program comprising program code means for performing the steps of the first aspect when the program is run on a computer.

According to a fifth aspect of the invention, there is provided a computer readable medium carrying a computer program comprising program code means for performing the steps of the first aspect when the program product is run on a computer.

According to a sixth aspect of the invention, there is provided a control unit for controlling urea injection in an exhaust aftertreatment system comprising at least a first catalytic reduction device arranged downstream of a first urea injector, and a second catalytic reduction device arranged downstream of a second urea injector, the control unit being configured to perform the steps of the method according to the first aspect.

Effects and features of the third, fourth, fifth, and sixth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims.

Like reference character refer to like elements throughout the description.

Figure 1:
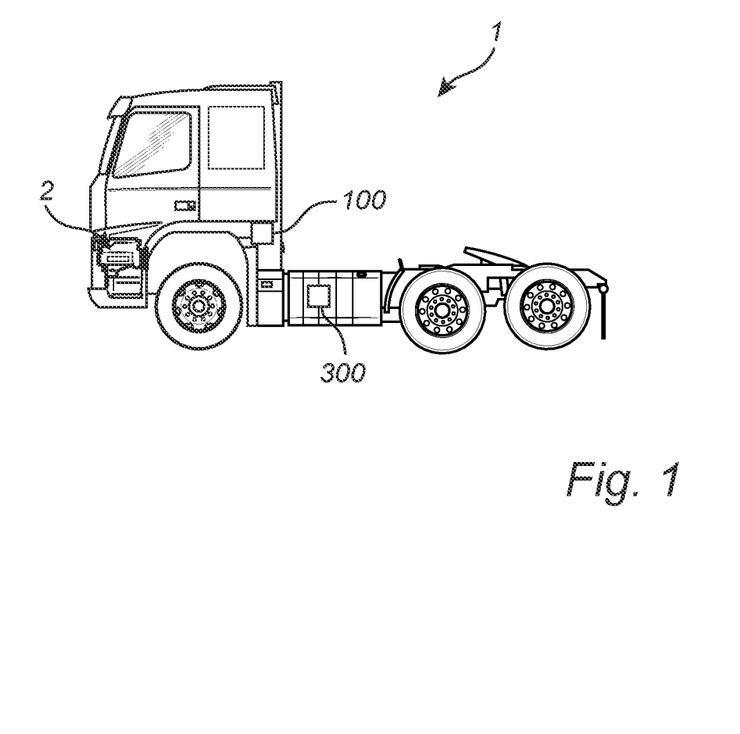
FIG. 1 is a vehicle in the form a truck according to example embodiments of the invention.

FIG. 1 illustrates a vehicle in the form of a truck 1 comprising an engine 2 such as for example an internal combustion engine. The internal combustion engine may be e.g. a diesel engine or a gasoline engine or any other type of internal combustion engine. The truck 1 may be a hybrid electric vehicle. The truck 1 further comprises an exhaust gas aftertreatment system 300 including e.g. catalytic devices, urea injectors, and nitrogen oxide sensors, as will be discussed in further detail with reference to subsequent drawings. The truck 1 further comprises a control unit 100 that will be discussed with reference to subsequent drawings.

Figure 2:
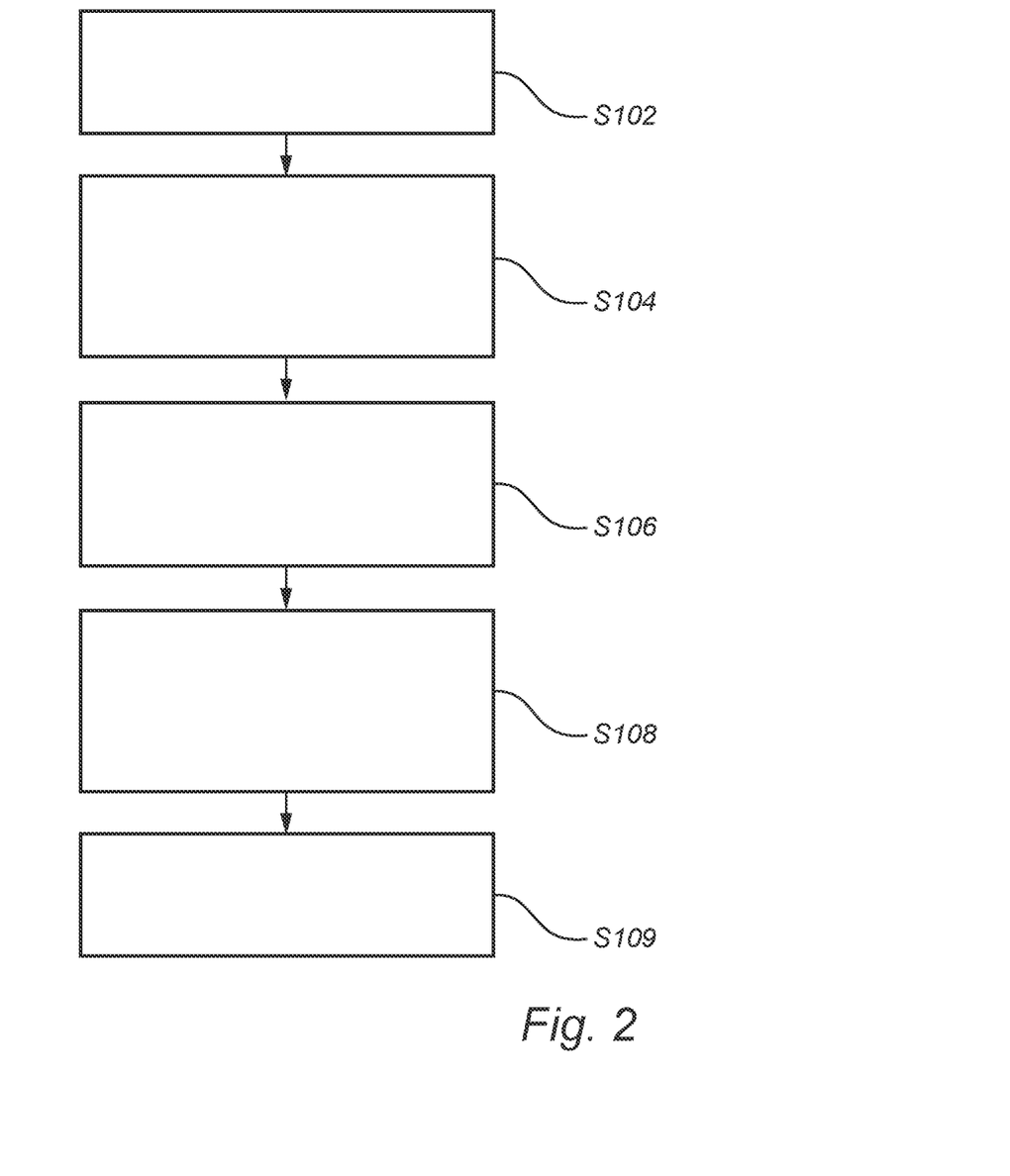
FIG. 2 is a flow-chart of method steps according to example embodiments of the invention.
Figure 3:
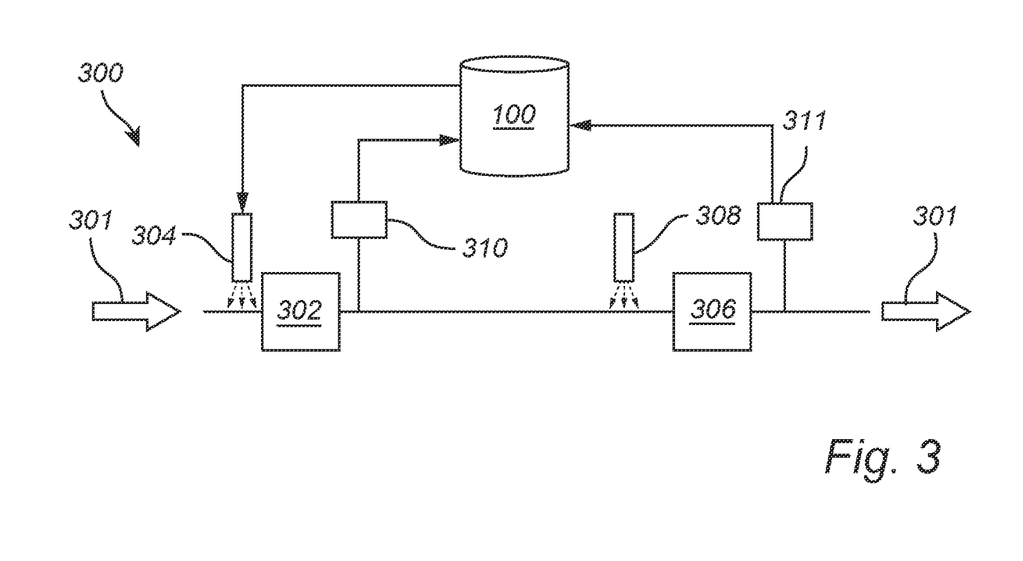
FIG. 3 is a schematic illustration of a system according to example embodiments of the invention; and, FIG. 4 is a schematic illustration of a system according to example embodiments of the invention.

FIG. 2 is a flow-chart of method steps according to embodiments of the invention. The method is for controlling urea injection in an exhaust aftertreatment system 300 of a vehicle. As schematically illustrated in FIG. 3, such exhaust aftertreatment system 300 comprises at least a first catalytic reduction device 302 arranged downstream of a first urea injector 304, and a second catalytic reduction device 306 arranged downstream of a second urea injector 308 and downstream of the first catalytic reduction device 302. The exhaust gas 301 passes from the engine, through the first catalytic reduction device 302 and the second catalytic reduction device 306 before being emitted from an exhaust outlet.

Generally, over-injecting urea in an upstream catalytic device, leads to ammonia-slip after the upstream catalytic device, e.g. unconverted ammonia slips through the upstream catalytic device. The excess ammonia may then be converted to nitrogen oxides such as nitrous oxide in downstream devices of exhaust aftertreatment systems. Embodiments of the present invention is directed to alleviating this problem.

The flow-chart in FIG. 2 and the schematic illustration in FIG. 3 are now described collectively.

In a step S102 of the method, urea is injected at a flow rate upstream of the first catalytic reduction device 302. For this, the first urea injector 304 is controlled by means of a control signal generated by the control unit 100. The first urea injector 304 is responsive to the control signal to inject urea based on information in the control signal, for example related to a desired flow rate or urea.

In step S104, a level of nitrogen oxides (NOx) downstream of the first catalytic reduction device 302 and upstream of the second catalytic reduction device 306 is measured. A sensor 310 is arranged for measuring the level of nitrogen oxides downstream of the first catalytic reduction device 302 and upstream of the second catalytic reduction device 306. Such nitrogen oxide sensors that measure several forms of nitrogen oxides, NOx, are well-known and will not be discussed in detail herein.

In step S106 the flow rate of the urea injection is controlled until the measured level of nitrogen oxides (NOx) fulfils a predetermined condition. For this, the first urea injector 304 is responsive to a second control signal generated by the control unit 100 to control the flow rate of the urea injection until the measured level of nitrogen oxides fulfils the predetermined condition upstream of the second catalytic reduction device.

In step S108, if the level of nitrogen oxides is decreasing in response to reducing the flow rate of the urea injection, the flow rate of the urea injection is reduced. Thus, the first urea injector 304 is responsive to a third control signal generated by the control unit 100 to reduce the flow rate of the urea injection when the level of nitrogen oxides is decreasing in response to reducing the flow rate of the urea injection.

In step S109, a flow rate of urea injection is controlled by the control unit 100 using the second urea injector upstream of the second catalytic reduction device according to the measured level of nitrogen oxides downstream of the first catalytic reduction device 302 and upstream of the second catalytic reduction device. The flow rate using the second urea injector 308 is advantageously adapted to ensure that the target total NOx-conversion of the aftertreatment system 300, 400 is maintained when varying the flow rate using the first injector upstream of the first catalytic reduction device 302. The amount of urea injected in to the second catalytic reduction device is typically be based on the amount of NOx being emitted from the first catalytic reduction device and the target NOx-level downstream the second catalytic reduction device. The urea injection to the second catalytic reduction device should thus be adopted to fulfil the target NOx-level downstream the second catalytic reduction device.

A control unit 100 may be arranged to receive data from the sensor 310 such that the level of nitrogen oxides can be evaluated. The control unit 100 is further connected with the first urea injector 304 and the second urea injector 308 such that the control unit 100 can transmit control signals to the first injector 304 and the second urea injector 308 to thereby control the injection of urea from the first urea injector 304 and the second urea injector 308.

In one possible implementation, the predetermined condition is a predetermined level of nitrogen oxides. In this implementation, controlling the flow rate of urea injection comprises, if the measured level of nitrogen oxides is below a threshold value, reducing S106 the flow rate of the urea injection until the level of nitrogen oxides is at or exceeds the predetermined level. In response to this reduction in urea injection by the first injector 304, if the sensor 310 detects that the level of nitrogen oxides is decreasing, it is an indication that a too high flow rate of urea was injected. Thus, step S108 includes to further reduce the flow rate of urea injected by the first urea injector 304.

In other words, first the urea injection flow rate is reduced in response to detecting, using the sensor 310, that the level of nitrogen oxides is below the threshold value. Secondly, if, in response to reducing the flow rate of urea injection using the first urea injector 304, the level of nitrogen oxides is decreasing, the flow rate of urea is reduced even further. For example, during the first reduction of flow rate of urea injection the level of nitrogen oxides is decreasing instead of increasing, ammonia-slip may have already occurred downstream of the first catalytic reduction device 302. To alleviate this, the flow rate of urea using the first urea injector 304 is further reduced until the measured level of nitrogen oxides using the sensor 310 is increasing.

In case the measured level of nitrogen oxides (NOx) fulfils the predetermined condition the reduction in urea injection flow rate may be stopped.

To allow for some hysteresis, the threshold value of nitrogen oxides may be different from the predetermined level in step S106. Regardless, the reduction in urea injection flow rate may be stopped once the level of nitrogen oxides is at or exceeds the predetermined level.

The control of urea flow rate from the first urea injector 304 may be implemented in different ways. In one embodiment, the system 300 comprises a PID controller for controlling the reduction in urea injection. The PID controller may be implemented as part of the control unit 100 and receives sensor data from sensor 310. The PID-controller evaluates the level of nitrogen oxides, as well as any changes thereof and compares it to a setpoint for continuously controlling the flow rate of the first urea injector based on the measured levels of nitrogen oxides. The PID controller is configured to operate the urea injection at a control point with minimum nitrogen oxide levels detected by the sensor 310, and once this is achieved, the urea injection is reduced further.

An alternative implementation is to calculate the reduction in urea injection by means of a factor that is multiplied with a modelled demand of urea injection (urea_flow_1). The modelled demand may derive from a nitrogen oxide control strategy of the first catalytic reduction device 302. A modelled demanded urea injection (urea_flow_1) to the first catalytic reduction device may be described as a function of various parameters such as engine load, engine speed, exhaust gas temperature (T_exh), first catalytic reduction device temperature (T_cat_1):

$$\text{urea\_flow\_1} = f(\text{load}, \text{speed}, \text{T\_exh}, \text{T\_cat\_1}, \dots).$$

The reduced urea flow rate may be calculated as:

$$\text{urea\_flow\_1\_reduced} = \text{factor} * f(\text{load}, \text{speed}, \text{T\_exh}, \text{T\_cat\_1}, \dots).$$

The factor is calculated as a function of the difference between a predetermined level (NOx_Min_1) of nitrogen oxides and the sensor value (NOx_sensor_value_measured) measured by the sensor 310, as $$\text{factor} = f(\text{NOx\_min\_1} - \text{NOx\_sensor\_value\_measured}).$$

Factors (factor) for different NOx sensor values may be stored in a memory device accessible to the control unit 100.

Hysteresis may be taken into account by allowing for a different predetermined level NOx_min_2 for turning off the urea reduction in a similar way. The flow rate of the injected urea from the first injector 304 may be limited to for example 80-90% of modelled NOx out from the engine. In FIG. 3, the engine, although not shown, is upstream of the first injector 304.

Either by means of the PID-controller, or by means of e.g. the above described factor calculation, the urea injection is continuously controlled based on the measured levels of nitrogen oxides.

Although the present invention may be implemented in combination with a further nitrogen oxide sensor arranged upstream of the first catalytic device, the method may advantageously include calculating the flow rate of urea injected upstream of the first catalytic reduction device based on a modelled value of nitrogen oxides upstream of the first selective catalytic.

Figure 4:
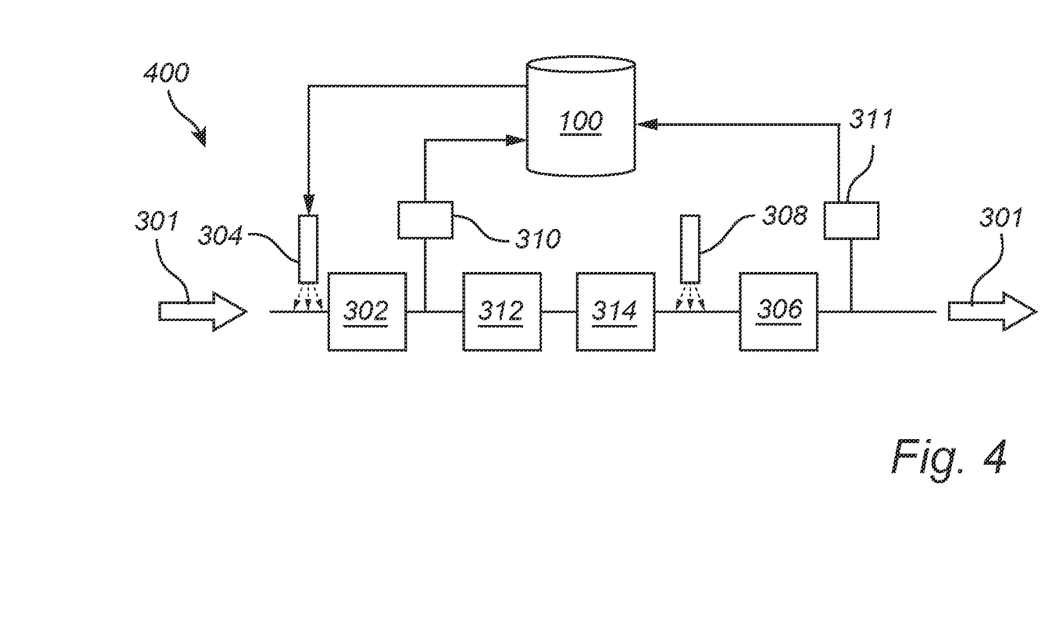

FIG. 4 conceptually illustrates an exhaust aftertreatment system 400 according to embodiments of the invention. As described with reference to FIG. 3, a first catalytic reduction device 302 is arranged downstream of the first urea injector 304.

Further, a second catalytic reduction device 306 is arranged downstream of the second urea injector 308, and a sensor 310 is arranged downstream of the first catalytic device 302 for measuring a level of nitrogen oxides (NOx) downstream of the first catalytic reduction device and upstream of the second catalytic reduction device.

Additionally, the first urea injector 302 is responsive to a control signal to inject urea at a flow rate upstream of the first catalytic reduction device. The first urea injector 302 is further responsive to a second control signal to control the flow rate of the urea injection until the level of nitrogen oxides (NOx) fulfils a predetermined condition. In response to the level of nitrogen oxides is decreasing in response to reducing the flow rate of the urea injection, the first urea injector 304 is responsive to a third control signal to reduce the flow rate of the urea injection. The control of the first urea injector based on the measured levels of nitrogen oxide may be provided by a control unit 100.

Further, the second urea injector 308 is responsive to a fourth control signal to control a flow rate of urea injection using the second urea injector 308 arranged upstream of the second catalytic reduction device 306 and downstream of the first catalytic reduction device 302 according to the measured level of nitrogen oxides measured by sensor 310 downstream of the first catalytic reduction device 302 and upstream of the second catalytic reduction device.

Further, second urea injector 308 is controlled to vary its flow rate depending on the urea flow rate from the first urea injector and the NOx level measured by the first sensor 310, to maintain a total NOx conversion over the combination of the first and second catalytic reduction devices at a target NOx conversion level providing a minimum NOx conversion level.

A second NOx sensor 311 may be arranged to measure the level of NOx downstream of the second catalytic reduction device 306 and provide a signal indicative thereof to the control unit 100. The control unit 100 can evaluate whether the target NOx conversion level is maintained and provide control signals to the second urea injector 308 to inject urea at a flow rate so that the target NOx conversion level can be maintained if a deviation from the target is detected.

The exhaust aftertreatment system 400, comprises a diesel oxidation catalyst 312 and a diesel particulate filter 314, arranged directly downstream of the first catalytic reduction device 302 and upstream of the second catalytic reduction device. Accordingly, the exhaust aftertreatment system 400 does not comprise an ammonia slip catalyst directly downstream of the first catalytic reduction device 302, and not between the first catalytic reduction device 302 and the second catalytic reduction device 306. The control of urea injection reduction provided by methods herein provides for reducing the amount urea slip to levels that are acceptable, i.e. that fulfils a target total NOx-conversion level.

The catalytic reduction devices may be any one of selective catalytic reduction devices, lean nitrogen oxide traps, hydrogen-carbon selective catalytic reduction devices and a selective catalytic reduction-coated diesel particulate filter.

In preferred embodiments, the catalytic reduction devices are selective catalytic reduction devices where the first catalytic reduction device 302 may be considered a pre-selective catalytic reduction device and the second catalytic reduction device 306 may be the main catalytic reduction device of the exhaust aftertreatment system 300. The pre-selective catalytic reduction device 302 may for example be smaller than the main catalytic reduction device 306.

Further, the second urea injector 308 is arranged downstream of each of the diesel oxidation catalyst 312 and the diesel particulate filter 314. The second urea injector 308 may be controllable by the control unit 100, i.e. the flow rate of urea injection in the exhaust gas stream by the second urea injector 308 may be controlled by means of control signals received from the control unit 100.

A control unit may include a microprocessor, microcontroller, programmable digital signal processor or another programmable device. Thus, the control unit comprises electronic circuits and connections (not shown) as well as processing circuitry (not shown) such that the control unit can communicate with different parts of the truck such as the brakes, suspension, driveline, in particular an electrical engine, an electric machine, a clutch, and a gearbox in order to at least partly operate the truck. The control unit may comprise modules in either hardware or software, or partially in hardware or software and communicate using known transmission buses such as CAN-bus and/or wireless communication capabilities. The processing circuitry may be a general-purpose processor or a specific processor. The control unit comprises a non-transitory memory for storing computer program code and data upon. Thus, the skilled addressee realizes that the control unit may be embodied by many different constructions.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims.

The invention claimed is:

1. A method for controlling urea injection in an exhaust aftertreatment system comprising at least a first catalytic reduction device arranged downstream of a first urea injector, and a second catalytic reduction device arranged downstream of a second urea injector, the method comprising:

injecting urea at a flow rate upstream of the first catalytic reduction device;

measuring a level of nitrogen oxides downstream of the first catalytic reduction device and upstream of the second catalytic reduction device;

controlling the flow rate of the urea injection until the measured level of nitrogen oxides fulfils a predetermined condition;

reducing the flow rate of the urea injection;

when the measured level of nitrogen oxides is decreasing in response to reducing the flow rate of the urea injection, reducing the flow rate of the urea injection further, and controlling a flow rate of urea injection using the second urea injector upstream of the second catalytic reduction device according to the measured level of nitrogen oxides downstream of the first catalytic reduction device and upstream of the second catalytic reduction device.

2. The method according to claim 1, wherein the predetermined condition is a predetermined level of nitrogen oxides, wherein the step of controlling the flow rate of urea injection using the first urea injector comprises, when the measured level of nitrogen oxides is below a threshold value, reducing the flow rate of the urea injection until the level of nitrogen oxides is at or exceeds the predetermined level.

3. The method according to claim 2, wherein the predetermined level of nitrogen oxides is different from the threshold value of nitrogen oxides.

4. The method according to claim 1, wherein the step of reducing the flow rate of the urea injection comprises reducing the flow rate of the urea injection further until the measured level of nitrogen oxides is increasing.

5. The method according to claim 1, comprising stopping the reduction in urea injection flow rate once the measured level of nitrogen oxides fulfils the predetermined condition.

6. The method according to claim 1, comprising calculating the flow rate of urea injected upstream of the first catalytic reduction device based on a modelled value of nitrogen oxides upstream of the first selective catalytic.

7. The method according to claim 1, wherein the urea injection is continuously controlled based on the measured levels of nitrogen oxides.

8. An exhaust aftertreatment system, comprising:

at least a first catalytic reduction device arranged downstream of a first urea injector, a second catalytic reduction device arranged downstream of a second urea injector and downstream of the first catalytic reduction device, and a sensor for measuring a level of nitrogen oxides downstream of the first catalytic reduction device and upstream of the second catalytic reduction device, and a control unit arranged to receive data from the sensor and to transmit control signals to the first injector and to the second injector to thereby control the injection of urea from the first urea injector and from the second urea injector, wherein the first urea injector is responsive to a control signal to inject urea at a flow rate upstream of the first catalytic reduction device, wherein, the first urea injector is responsive to a second control signal to control the flow rate of the urea injection until the measured level of nitrogen oxides fulfils a predetermined condition;

control the first urea injector to reduce the flow rate of the urea injection;

determine that the measured level of nitrogen oxides is decreasing in response to reducing the flow rate of the urea injection from the first urea injector;

in response to that the measured level of nitrogen oxides is decreasing in response to reducing the flow rate of the urea injection, the first urea injector is responsive to a third control signal to reduce the flow rate of the urea injection, and the second urea injector is responsive to a control signal to control a flow rate of urea injection using the second urea injector upstream of the second catalytic reduction device and downstream of the first catalytic reduction device according to the measured level of nitrogen oxides downstream of the first catalytic reduction device and upstream of the second catalytic reduction device.

9. The exhaust aftertreatment system according to claim 8, comprising at least one of a Diesel Oxidation Catalyst and Diesel Particulate Filter, arranged directly downstream of the first catalytic reduction device and upstream of the second catalytic reduction device.

10. The exhaust aftertreatment system according to claim 9, wherein the second urea injector is arranged downstream of the at least one of a Diesel Oxidation Catalyst and Diesel Particulate Filter.

11. The exhaust aftertreatment system according to claim 8, comprising a PI D-controller for continuously controlling the flow rate of the first urea injector based on the measured levels of nitrogen oxides.

12. A vehicle comprising an exhaust aftertreatment system according to claim 8.

13. A non-transitory computer readable medium carrying a computer program comprising program code for performing the steps of claim 1 when said program code is run on a computer.

14. A control unit comprising a controller for controlling urea injection in an exhaust aftertreatment system comprising at least a first catalytic reduction device arranged downstream of a first urea injector, and a second catalytic reduction device arranged downstream of a second urea injector, the controller being configured to perform the steps of the method according to claim 1.

* * * * *